United States Patent [19]

Sawai et al.

[11] Patent Number: 5,577,323
[45] Date of Patent: Nov. 26, 1996

[54] METHOD OF MANUFACTORING A RACE RING FOR A ROLLING BEARING

[75] Inventors: Hiroyuki Sawai; Takashi Yoshikai, both of Kanagawa, Japan

[73] Assignee: NSK Ltd., Tokyo, Japan

[21] Appl. No.: 393,392

[22] Filed: Feb. 23, 1995

Related U.S. Application Data

[62] Division of Ser. No. 162,765, Dec. 8, 1993, abandoned.

[30] Foreign Application Priority Data

Dec. 8, 1992 [JP] Japan .................................. 4-351827
Dec. 8, 1992 [JP] Japan .................................. 4-351828

[51] Int. Cl.⁶ .................................................. F16C 33/64
[52] U.S. Cl. .................. 29/898.066; 29/412; 29/425; 29/DIG. 32; 384/499; 384/513
[58] Field of Search ....................... 29/898.066, 412, 29/425, 898.063, DIG. 32; 384/499, 513

[56] References Cited

U.S. PATENT DOCUMENTS

| | | |
|---|---|---|
| T102,401 | 11/1982 | Toth . |
| 1,366,026 | 1/1921 | Rydbeck . |
| 3,343,895 | 9/1967 | Morrison . |
| 3,387,900 | 6/1968 | Morrison . |
| 3,496,619 | 2/1970 | Constant .......................... 29/898.066 |
| 3,528,271 | 9/1970 | Di Ponio . |
| 3,960,419 | 6/1976 | Brawley . |
| 5,261,159 | 11/1993 | Yasuda et al .................. 29/898.066 X |
| 5,340,221 | 8/1994 | Yasuda et al. . |

FOREIGN PATENT DOCUMENTS

| | | | |
|---|---|---|---|
| 59-107740 | 6/1984 | Japan ................. | 29/898.066 |
| 279782 | 3/1928 | United Kingdom . | |
| 375682 | 7/1932 | United Kingdom . | |
| 383725 | 12/1932 | United Kingdom . | |
| 935527 | 8/1963 | United Kingdom ............. | 29/898.066 |
| 126371 | 2/1972 | United Kingdom . | |
| 2273749 | 6/1994 | United Kingdom ............. | 29/898.066 |

*Primary Examiner*—Carl J. Arbes
*Attorney, Agent, or Firm*—Sughrue, Mion, Zinn, Macpeak & Seas

[57] ABSTRACT

It is an object of the invention to provide a method of manufacturing an inner ring for a rolling bearing in which the directions of the metal flows of the inner ring can be made substantially parallel to the shape of the race surface of the inner ring to thereby manufacture a rolling bearing inner ring having an enhanced durability. In the manufacturing method, a cylindrical steel billet 1 (shown in FIG. 1 (a) including a large number of metal flows 2 formed in the axial direction of the section thereof is held and upset by and between first upper and lower metallic molds 4a and 4b each having a transfer surface 3 for the race surface of the inner ring and, at the same time, recesses 6 are formed in the upper and lower plane portions of the cylindrical steel billet 1 respectively (shown in FIG. 1(c), next after the upper and lower shoulder portions of the recesses are respectively held by and between second upper and lower metallic molds 9a and 9b (shown in FIG. 1 (c), the recesses 6 are pressed equally from above and from below by the second upper and lower metallic molds 9a and 9b to thereby form a centrally pressed portion 10, then the inner portion of the centrally pressed portion 10 is removed to thereby produce a ring-shaped workpiece, and finally the ring-shaped workpiece is rolled and shaved to thereby manufacture an inner ring.

7 Claims, 5 Drawing Sheets

METHOD OF MANUFACTORING A RACE RING FOR A ROLLING BEARING

This is a divisional of application No. 08/162,765 filed Dec. 8, 1993, now abandoned.

BACKGROUND OF THE INVENTION

The present invention relates to a method of manufacturing an inner or outer ring for a rolling bearing and, in particular, to such a method which manufactures an inner or outer ring for a rolling bearing by working the inner or outer ring plastically.

Conventionally, when an inner or outer ring for a rolling bearing is manufactured by plastic working, after a cylindrical steel billet is held and pressed by and between upper and lower metallic molds, that is, the steel billet is upset, the central portion of the cylindrical steel billet in the axial direction thereof is pressed, that is, the steel billet is centrally pressed to thereby reduce the thickness of the central portion thereof, then the inner portion of the centrally pressed portion of the steel billet is removed by punching or the like to thereby produce a ring-shaped workpiece, after then the outer peripheral surface of the ring-shaped workpiece is held by a forming roll and is also rolled by use of a mandrel roll, and the ring-shaped workpiece is then shaved by machining to thereby manufacture an inner or outer ring for a rolling bearing.

However, in the above-mentioned conventional inner ring manufacturing method, due to the fact that, as described above, in the centrally pressing step after the upsetting step, the axially central portion of the cylindrical steel billet is pressed only from above, the direction of the metal fiber flows which will be hereinafter referred to simply as "metal flows") of the steel billet cannot be identical with the shape of the race surface of the inner ring. Therefore, when the race surface is formed by machining, the metal flows are cut off and the cut-off surfaces are exposed to the race surface, which causes the life of the rolling bearing to be shortened.

Figure 6:
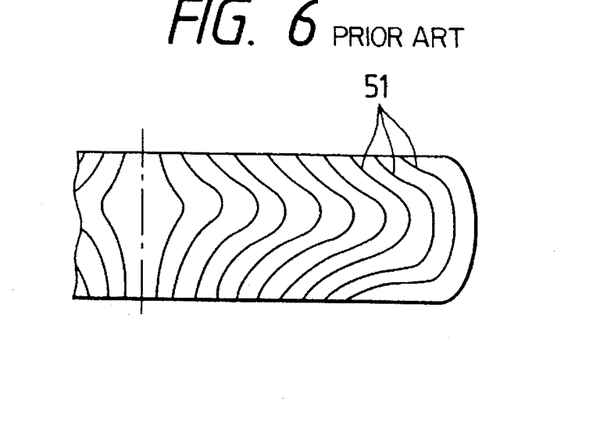
FIG. 6 is a section view of a conventional workpiece, showing the condition of metal flows after the workpiece is upset.

In addition, in the above-mentioned conventional rolling bearing outer ring manufacturing method, while the cylindrical steel billet is heated before it is upset, because the lower metallic mold has a longer contact time for contact with the heated steel billet than the upper metallic mold, a temperature distribution is not uniform but the temperature becomes lower as it goes down toward the bottom. Therefore, when an upsetting step is carried out once as in the above conventional manufacturing method, as shown in FIG. 6, metal fiber flows (which will be hereinafter referred to simply as "metal flows") 51 become asymmetric with respect to the vertical direction thereof. Also, the center pushing is executed from one direction, which increases the asymmetry of the metal flows 51. As a result of this, when the rolling operation is finally executed, the metal flows 51 of the workpiece are not identical with the race surface of a bearing outer ring or race. Accordingly, when the workpiece is machined and formed, the metal flows 51 are cut off and the cut-off surface is exposed onto the outer ring surface, which causes the life of the bearing to be shortened.

SUMMARY OF THE INVENTION

The present invention aims at eliminating the drawbacks found in the above-mentioned conventional inner race manufacturing method. Accordingly, it is an object of a first aspect of the invention to provide a method of manufacturing an inner ring for a rolling bearing which is able to manufacture an inner ring for a rolling bearing having an excellent durability.

In achieving the above object, according to the invention, there is provided a race ring for a rolling bearing made from a cylindrical steel billet including a large number of metal flows in the axial direction of the section thereof, wherein the race ring has a race surface; and the metal flows of the race ring is so curved that the metal flows are substantially made identical with the shape of the race surface of the race ring. In addition, there is provided a method of manufacturing a race ring for a rolling bearing comprising the steps of: upsetting a cylindrical steel billet including a large number of metal flows formed in the axial direction in the cross-section thereof to thereby form an upset workpiece, the cylindrical steel billet being subjected to the upsetting process in accordance with a predetermined upsetting ratio; pressing the upset workpiece equally from above and from below to thereby form centrally pressed portions of the upper and lower surfaces of the upset workpiece, a configuration of the centrally pressed portions being symmetrical with respect to the axis of the workpiece in a cross-sectional plane including the axis of the workpiece; removing the inner portion of the centrally pressed portions of the pressed workpiece to thereby form a ring-shaped workpiece; holding the outer peripheral portions and the upper and lower surface of the ring-shaped workpiece with a forming roll and pressing the inner peripheral surface of the ring-shaped workpiece with a mandrel roll; and rolling the ring-shaped workpiece between the forming roll and the mandrel roll so as to reduce the sectional area of the ring-shaped workpiece in a radial direction thereof. Furthermore, there is further provided a rolling bearing inner ring manufacturing method, in which a cylindrical steel billet including a large number of metal flows formed in the axial direction of the section thereof is upset by first upper and lower metallic molds each having a transfer surface for the race surface of an inner ring and at the same time recesses are formed in the upper and lower plane portions of the cylindrical steel billet, then after the upper and lower shoulder portions of the respective recesses are held by and between second upper and lower metallic molds, the recesses are pressed equally from above and from below to provide a centrally pressed portion, after then the inner portion of the centrally pressed portion is removed to thereby produce a ring-shaped workpiece, and then the outer periphery of the ring-shaped workpiece is held and the inner surface thereof is rolled to thereby expand the diameter of the inner surface thereof.

According to the present method, since the cylindrical steel billet including a large number of metal flows formed in the axial direction of the section thereof is held and upset by and between the first upper and lower metallic molds, the metal flows in the outside diameter of the steel billet are deformed along the shapes of the first upper and lower metallic molds, so that the directions of the metal flows can be made identical with the shape of the race surface. Also, it is possible to center the steel billet in the centrally pressing step by use of the recesses formed when the steel billet is upset and, further, because the centrally pressed portion is produced by pressing the central portion of the steel billet equally from above and from below, the upper and lower symmetry of the metal flows can be secured. Moreover, in the rolling operation after the removal of the inner portion of the centrally pressed portion, because, with the outer periphery of the ring-shaped workpiece held, the inner surface of the ring-shaped workpiece is rolled, it is possible to manufacture an race ring for a rolling bearing in such a manner that the directions of the metal flows are identical with the outer peripheral shape, which is the race surface, of the finished product or the race ring.

Further, the use of the race ring according to the present invention can provide a bearing which has an enhanced durability.

In addition, it is also an object of the invention to provide a method of manufacturing an outer ring for a rolling bearing which is able to produce an outer ring for a rolling bearing having an excellent durability.

In attaining the above object, according to a second aspect of the invention, there is provided a method of manufacturing an outer race for a rolling bearing, which comprises the steps of: heating a cylindrical steel billet having a first given height H and including a large number of metal flows formed in the axial direction of its section to a hot forging area, and then upsetting the heated billet to thereby produce a first upsetting workpiece having a second given height H1; reversing the first upset workpiece and then upsetting the first upset workpiece to thereby produce a second upset workpiece having a third given height H2; pressing the plane surface central portion of the second upset workpiece equally from above and from below to thereby form a centrally pressed portion; removing the inner portion of the centrally pressed portion of the second upset workpiece to thereby form a ring-shaped workpiece; and rolling the ring-shaped workpiece to thereby manufacture an outer ring for a rolling bearing. And the invention is further characterized by setting an upsetting ratio as 0.50–0.65, the upsetting ratio being an amount of reduction (H–H2) of the third given height H2 of the cylindrical steel billet with respect to the first given height H of the cylindrical steel billet.

According to the above-mentioned manufacturing method of the invention, due to the fact that the first upset workpiece produced by upsetting the heated cylindrical billet is reversed and is then upset again to thereby produce the second upset workpiece, the thermal symmetry of the product (namely, the second upset workpiece) can be maintained to thereby secure symmetry in the axial direction of the metal flows and, at the same time, the metal flows of the interiors of the workpiece can be curved, so that the shape of the race surface of an outer ring can be made identical with the metal flows.

Also, when the height of the steel billet before upsetting (the first given height) is expressed as H and the height of the second upset workpiece (the third given height) is expressed as H2, then the upsetting ratio η can be defined by the following equation (1):

$$\eta = (H - H2)/H \qquad (1)$$

Figure 5A:
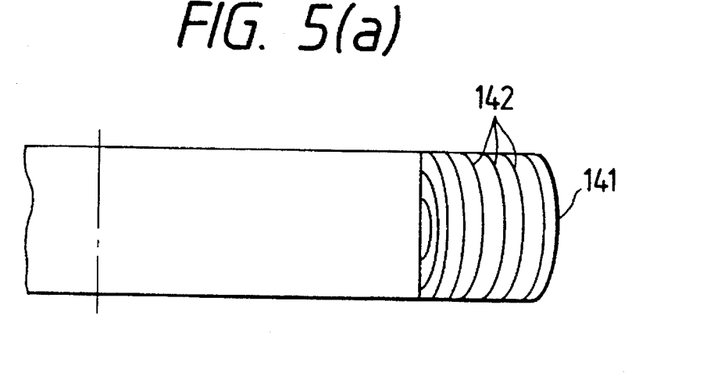
Figure 5B:
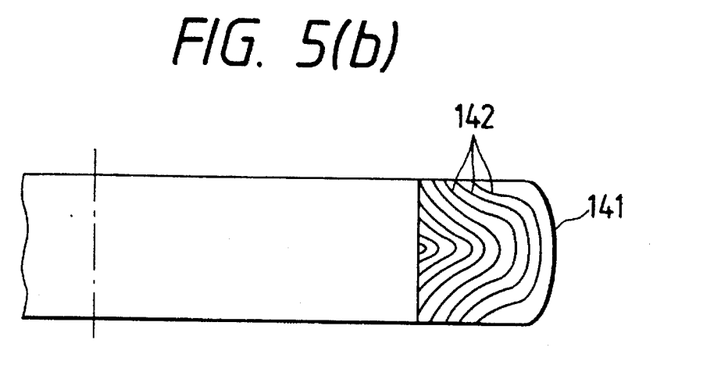

When the upsetting ratio η is small, then the curves of the metal flows 142 are small and, as shown in FIG. 5 (a), after completion of the rolling operation, the curves of the metal flows 142 are excessively small in the portions thereof corresponding to the race surface and thus they are not identical with the race surface. On the other hand, when the upsetting ratio η is large, as shown in FIG. 5 (b), the curves of the metal flows 142 are also large and, after completion of the rolling operation, the curves of the metal flows 142 are too large in the portions thereof corresponding to the race surface to be identical with the race surface. Accordingly, in the upsetting ratio η, there exists the optimum range. According to the invention, the upsetting ratio η is set as 0.50–0.65 by means of the results of our experiments and the like and, for this reason, it is possible to form metal flows which are identical with the race surface of the outer ring.

BRIEF DESCRIPTION OF THE DRAWINGS

FIGS. 5 (a) and 5 (b) are an explanatory view used to explain the critical meaning of the optimum range of an upsetting ratio η.

DETAILED DESCRIPTION OF THE PREFERRED EMBODIMENTS

Description will be given hereinbelow of the embodiment of a method of manufacturing an inner ring for a rolling bearing according to the invention with reference to the accompanying drawings.

Now, FIGS. 1(a) to 1(d) and FIGS. 2(a) to 2(c) are flow charts which sequentially show manufacturing steps of a divisional inner ring for a rolling bearing, which is a first embodiment of a method of manufacturing an inner and outer ring for a rolling bearing according to the invention.

In the respective views, there are shown general views of the section of a steel billet, which is a workpiece in the manufacturing steps, extending in the axial direction (in FIGS. 1 and 2, in the vertical direction), and a one-dot chained line shows a central axis of the steel billet.

Figure 1A:
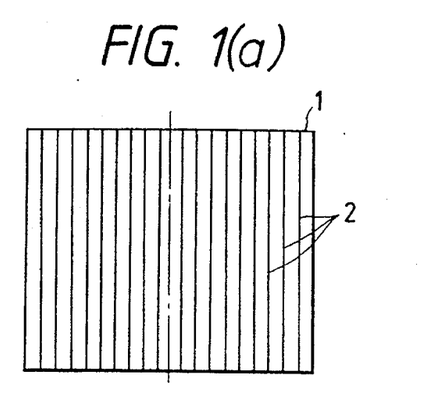
FIGS. 1(a), 1(b), 1(c) and 1(d) are a manufacturing flow chart (½) of a front half section of a first embodiment of a method of manufacturing an inner ring for a rolling bearing according to the invention.

As shown in FIG. 1(a), the metal flows 2 of the steel billet I are made to extend in parallel to one another in the axial direction of the steel billet 1 before the steel billet 1 is machined.

Figure 1B:
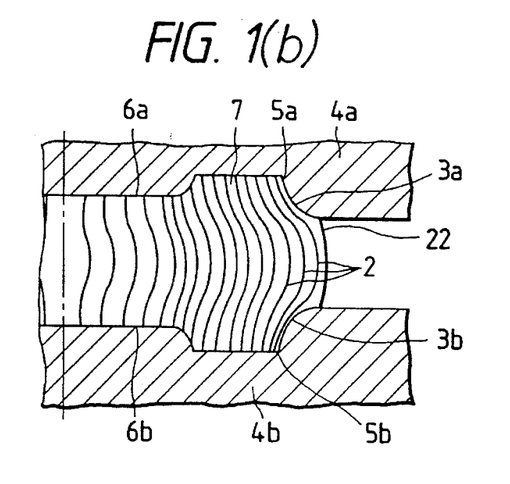

In the present manufacturing method, at first, as shown in FIG. 1(b), a pair of upper and lower shoulder portions 5a, 5b of the steel billet 1 are held by and between first upper and lower metallic molds 4a and 4b respectively having race surfaces 3a and 3b for the race surfaces of a divisional inner ring, and the steel billet 1 is pressed from above with a given pressure so that recesses 6a and 6b to be used for "positioning" in a centrally pressing step to be described later can be formed in the upper and lower central portion of the steel billet 1, and after then the steel billet 1 is upset to thereby produce an upset workpiece 7. Obviously from FIG. 1(b), the metal flows 2 produced in the upsetting step are deformed into such shapes as identical with the transfer surfaces 3a and 3b, and the side surface central portion of the steel billet, which is not restricted by the first upper and lower metallic molds 4a and 4b, is projected outwardly in the radial direction of the steel billet 1 to thereby provide a projected portion 22.

Figure 1C:
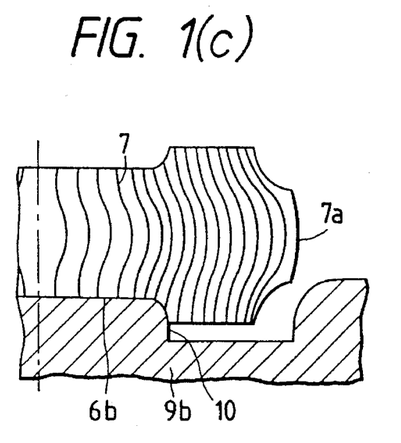

Next, as shown in FIG. 1(c), by use of a second lower metallic mold 9b having a stepped portion 10, the recess 6b is secured to the stepped portion 10 to thereby carry out the "positioning" operation. That is, the recess 6b of the upset workpiece 7 is guided by the stepped portion 10 and the upset workpiece 7 is centered, so that the projected portion 7a of the upset workpiece 7 are made uniform with respect to the radial direction thereof. This can keep the uniformity of the outer shape of the projected portion 7a in the radial direction even when a centrally pressing operation to be described later is executed.

Figure 1D:
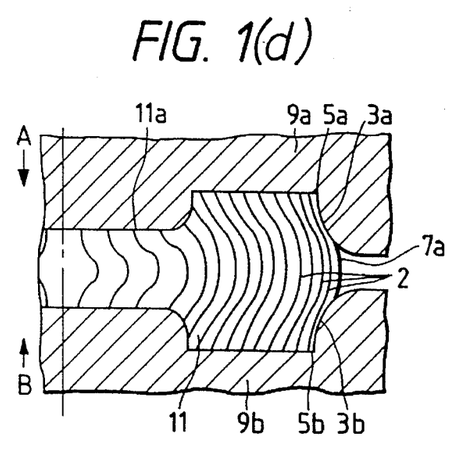

Then, as shown in FIG. 1(d), the centrally pressing operation is executed. That is, with the upper and lower shoulder portions 5a and 5b of the upset workpiece 7 held by and between the second upper and lower metallic molds 9a and 9b respectively having transfer surfaces 3a and 3b for the divisional race, the upset workpiece 7 is pressed in directions of arrows A and B with a given uniform pressure to perform a pressing operation on the central portion of the upset workpiece 7 to thereby reduce the thicknesses of the recesses 6a and 6b, so that a centrally pressed workpiece 11 having a centrally pressed portion 11a can be produced. In this manner, by applying the uniform pressures to the upset workpiece 7 from above and from below, there is eliminated the possibility that there can be produced any deviation in an amount of extension of the outer periphery of the upset workpiece 7. This prevents the shape of the race surface of the inner ring from being deformed and thus makes it possible to form the metal flows 2 which are identical with the shape of the race surface of the finished product or inner ring. That is, because the centering of the upset workpiece 7 is executed accurately in the centrally pressing step as well, the directions of the metal flows 2 are identical with the shape of the race surface of the inner ring as described above. Also, the accurate centering of the upset workpiece 7 prevents the disturbances of the metal flows 2 due to a so called "folding" or the like in a rolling operation to be described later.

Figure 2A:
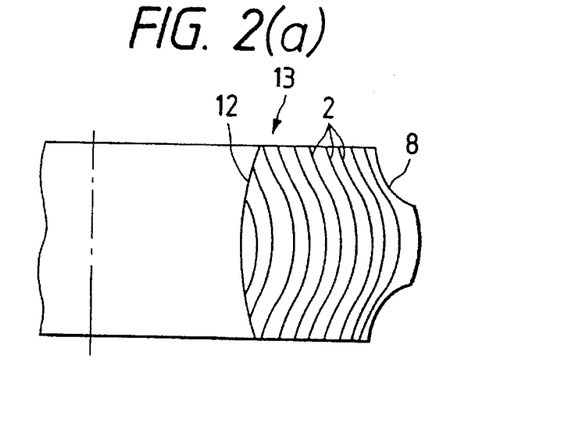
FIGS. 2(a), 2(b), and 2(c) are a manufacturing flow chart (2/2) of a rear half section of the first embodiment.
Figure 2B:
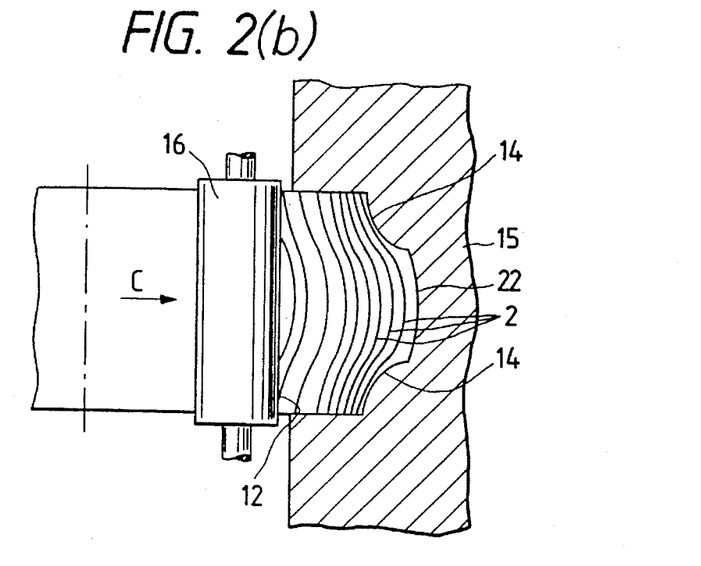

Next, as shown in FIG. 2(b), a punching operation is executed to remove the inner portion of the upset workpiece 7 to thereby produce a ring-shaped workpiece 13 having a through hole 12.

After then, as shown in FIG. 2(b), while the outer periphery of the ring-shaped workpiece 13 is held by and between a forming roll 15 having a pressuring surface 14 identical in shape with the transfer surface of the race surface 8, the inner peripheral surface of the ring-shaped workpiece 13 is pressed in a direction of an arrow C by a mandrel roll 16 to thereby expand the diameter of the through hole 12. When the diameter of the through hole 12 reaches a given value, then the rolling operation is completed. This can form metal flows 2 the directions of which are identical with the shape of the race surface 8.

Figure 2C:
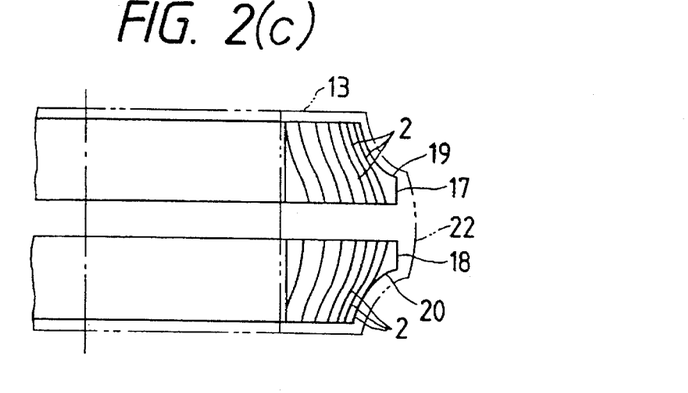

Finally, as shown in FIG. 2(c), the race surface 8 is shaved by machining to thereby manufacture two divisional inner rings 17 and 18, one for one, respectively including the metal flows 2 the directions of which are identical with the shapes of race surfaces 19 and 20.

In the divisional inner rings 17 and 18 manufactured in this manner, since the respective race surfaces 19 and 20 thereof are identical in shape with the metal flows thereof, there is eliminated the possibility that the metal flows of the divisional inner rings 17 and 18 can be cut off and be exposed to the race surfaces 19 and 20, which can extend the life of the inner rings and also can improve the durability of the rolling bearing using such inner rings.

Of course, the invention is not limited to the above-mentioned embodiment, but various changes and modifications are possible without departing from the scope and spirit of the patent claim set forth in this specification. For example, although in the above embodiment description has been given of the divisional inner rings, the invention can also apply similarly to a single inner ring which includes two races. Also, by changing the shapes of metallic molds used in the upsetting and centrally pressing operations, the invention can also apply to an inner ring which has a single race formed in the axial direction of the central portion thereof. Further, although in the illustrated embodiment the divisional inner rings are manufactured by cold forging, the invention can also apply to a case in which divisional inner rings are manufactured by hot forging.

As has been described heretofore in detail, according to a method of manufacturing an inner ring for a rolling bearing in accordance with the invention, a cylindrical steel billet including a large number of metal flows formed in the axial direction of the section thereof is held and upset by and between first upper and lower metallic molds respectively having transfer surfaces for the race surfaces of the inner rings and at the same time recesses are formed in the upper and lower plane surfaces of the cylindrical steel billet, next after the upper and lower shoulder portions of the recesses are respectively held by and between second upper and lower metallic molds, the recessed portions are pressed equally from above and from below to thereby produce a centrally pressed portion, then the inner portion of the centrally pressed portion is removed to thereby produce a ring-shaped workpiece, and, with the outer periphery of the ring-shaped workpiece held, the inner peripheral surface of the ring-shaped workpiece is rolled to thereby expand the diameter of the inner peripheral surface thereof. This makes it possible to manufacture an inner ring which has metal flows identical with the shape of the race surface, and use of such inner ring can provide a bearing which has an enhanced durability.

In addition, description will be given hereinbelow in detail of a second embodiment of a method of manufacturing an outer ring for a rolling bearing according to the invention with reference to the accompanying drawings.

FIGS. 3(a) to 3(c) and FIGS. 4(a) to 4(d) are respectively manufacturing sequential flow diagrams of the second embodiment of a method of manufacturing an outer ring for a rolling bearing according to the invention.

In the respective figures, there is shown a general view of a section of a steel billet in the axial direction thereof (in the vertical direction in the respective figures), in which the steel billet is a workpiece to be upset in the manufacturing steps and a one-dot chained line expresses a central axis of the steel billet.

Figure 3A:
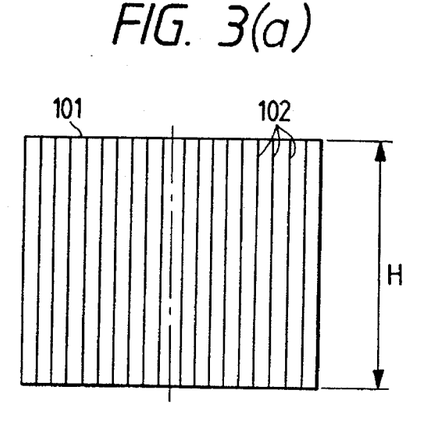
FIGS. 3(a), 3(b), and 3(c); are a manufacturing flow chart (½) of a second embodiment of a method of manufacturing an outer ring for a rolling bearing according to the invention.

In FIG. 3(a), I designates a cylindrical steel billet (which will be hereinafter referred to simply as a steel billet) which is formed of a blank produced by extend forging and has a height H of 102 mm. As shown in FIG. 3 (I, in the steel billet I, there are formed a large number of metal flows 102, which are extended in parallel to one another in the axial direction of the steel billet I.

Figure 3B:
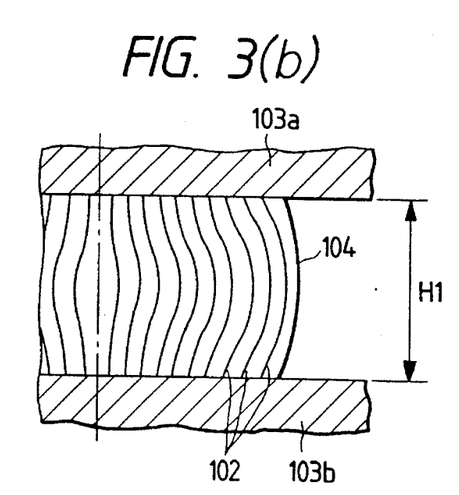
Figure 3C:
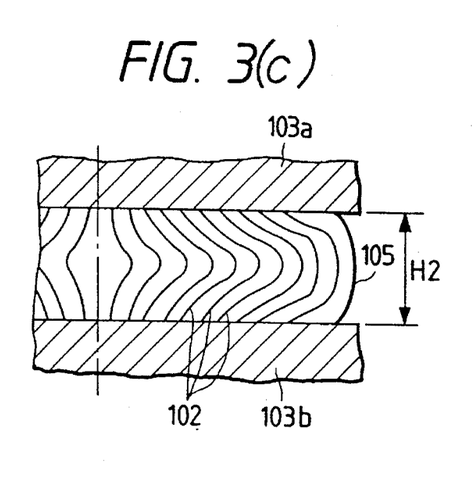

In the present manufacturing method, at first, the steel billet I is heated to a hot forging area. After then, as shown in FIG. 3(b), the heated steel billet I is held by and between a first upper metallic mold 103a and a first lower metallic mold 103b, and is pressed from above with a given pressure to execute a first upsetting to thereby produce a first upset workpiece 104 having a height, for example, of 73 mm. Next, the first upset workpiece 104 is reversed and is again held by and between the first upper and lower metallic molds 103a and 103b, and a second upsetting operation is performed on the workpiece 104 such that an upsetting ratio η to be defined by the following equation (1) is in the range of 0.50–0.65, thereby producing a second upset workpiece 105.

$$\eta = (H - H2)/H \tag{1}$$

where H2 expresses the height of the second upset workpiece 105. In the present embodiment, the workpiece 105 is formed such that it has a height H2=44 mm and, therefore, the upsetting ratio is set as 0.57 according to the equation (1).

In other words, in such hot forging operation as performed in accordance with the present embodiment, since the contact time of the first lower metallic mold 103a with the steel billet 101 is longer than that of the first upper metallic mold 103b, the temperature distribution of the interior of the steel billet 101 is not uniform so that the temperature thereof becomes lower as it goes down toward the bottom thereof. To cope with this, the above-mentioned upsetting step is divided into two upsetting operations and the object to be upset (that is, a workpiece) is reversed between the first and second upsetting operations, thereby eliminating the possibility that the metal flows 102 can be asymmetric to one another due to the ununiformity of the temperature distribution. Also, because the upsetting ratio η is set as 0.57 (which is included in the given range of 0.50–0.65), it is possible to form the shape of the outer ring race surface 116 (see FIG. 4(d) to be described later) and the curved shapes of the metal flows 102 after being rolled such that they are identical with each other comparatively better than ever.

Figure 4A:
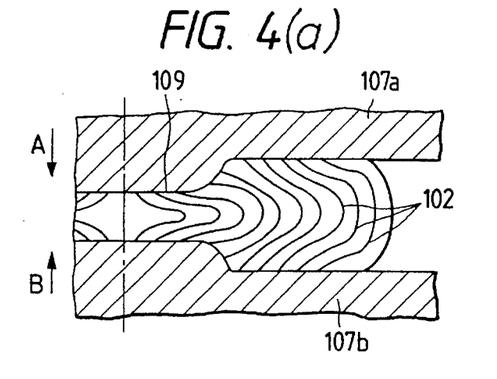
FIGS. 4(a), 4(b), 4(c) and 4(d) are a manufacturing flow chart (2/2) of the second embodiment of a method of manufacturing an outer ring for a rolling bearing according to the invention.
Figure 4B:
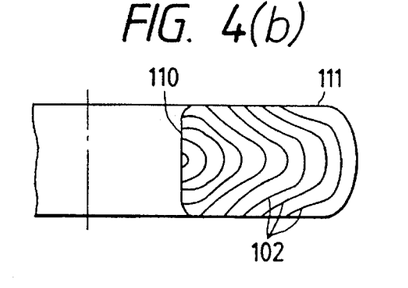

Next, the second upset workpiece 105 is again revered, as shown in FIG. 4(a), the plane surface central portion of the second upset workpiece 105 is held by and between the second upper metallic mold 107a and second lower metallic mold 107b, the plane surface central portion is pressed with given equal pressures in directions of arrows A and B to thereby reduce the thickness of the central portion and thus provide a centrally pressed portion 109 in the second upset workpiece 105, and next, as shown in FIG. 4(b), the inner portion of the centrally pressed portion 109 of the second upset workpiece 105 is removed by punching or a similar operation, so that a ring-shaped workpiece 111 with a through hole 110 is formed.

Figure 4C:
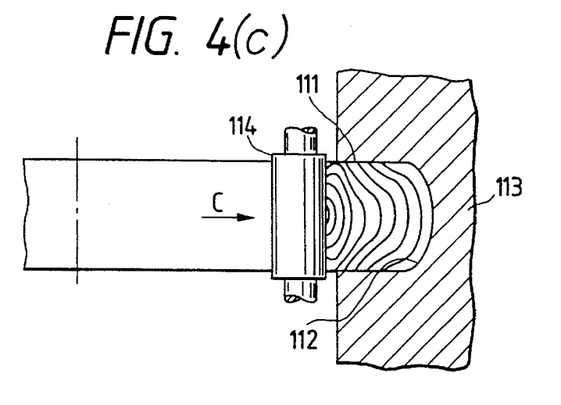

Next, as shown in FIG. 4(c), the ring-shaped workpiece 111 is held in the outer peripheral portions thereof by a forming roll 113 having a pressurizing surface 112 which is identical with the shape of the an outer periphery of the removed workpiece, the inner peripheral surface of the ring-shaped workpiece 111 is pressed in a direction of an arrow C by a mandrel roll 114 to thereby enlarge the hole diameter of the through hole 110, and the rolling operation is completed when the hole diameter reaches a given value. This completes the formation of the metal flows 102 which are identical with the shape of the race surface inside the ring-shaped workpiece at the depth shaved by machining the ring-shaped workpiece.

Figure 4D:
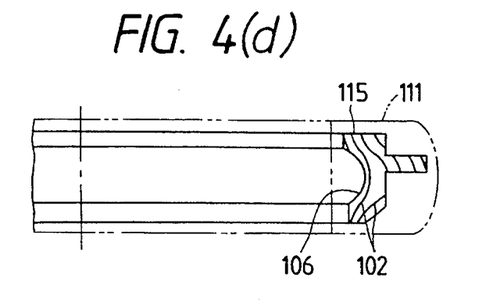

Finally, as shown in FIG. 4(d), the ring-shaped workpiece 111 is shaved by machining to thereby provide an outer ring 115 having the metal flows 102 which are identical with the shape of the race surface 116.

The thus manufactured outer ring 115 can avoid the possibility that the cut surfaces of the metal flows 102—can be exposed to the race surface, can extend the life of the outer ring 115, and can improve the durability of the rolling bearing using such outer ring.

Of course, the present invention is not limited to the above-mentioned embodiment but various changes and modifications are possible without departing from the subject matter of the invention. For example, when the cooling effect of the workpiece is great, the workpiece may be heated again between the respective steps before the respective steps are executed.

As has been described heretofore in detail, in the method of manufacturing an outer ring for a rolling bearing according to the invention, due to the fact that a cylindrical steel billet including a large number of metal flows extending in the axial direction of the section thereof and also having a first given height H is heated up to a hot forging area and is then upset to thereby produce a first upset workpiece having a second given height H1, then the first upset workpiece is reversed and is then upset again to produce a second upset workpiece having a third given height H2, next the plane surface of the central portion of the second upset workpiece is pressed equally from above and from below to produce a centrally pressed portion in the second upset workpiece, after then the inner portion of the centrally pressed portion of the second workpiece is removed to thereby provide a ring-shaped workpiece, and the ring-shaped workpiece is then rolled, the symmetry of the metal flows can be secured, an outer ring having metal flows comparatively better identical with the shape of a race surface can be produced, and the durability of a rolling bearing using such outer ring can be improved.

Also, due to the fact that an upsetting ratio, which is a ratio of a reduction amount (H–H2) of the first given height H of the cylindrical steel billet with the first given height H of the cylindrical steel billet, is set in the range of 0.50–0.65, it is possible to obtain an outer ring including metal flows which have a curved ratio substantially equal to that of a race surface.

However, while the use of the balls, as rolling elements rolling between the inner race and the outer race, in the above-mentioned embodiments of the present invention is described, it should of course be understood that the present invention can also apply to a rolling bearing in which, for example, spherical rollers are used as the rolling elements.

In addition, while the present invention has been described above with respect to a single preferred embodiment thereof, it should of course be understood that the present invention should not be limited only to this embodiment but various change or modification may be made without departure from the scope of the present invention as defined by the appended claims.

What is claimed is:

1. A method of manufacturing a race ring for a rolling bearing, comprising the steps of:

(a) upsetting a cylindrical steel billet including a plurality of metal flows extending axially in a cross-section from above the billet to form an upset workpiece having an inner portion;

(b) pressing the upset workpiece equally from above and below thereof to form a pressed workpiece having central recesses in an inner portion thereof, the central recesses being formed by reducing a thickness of the inner portion of the upset workpiece, having the same depth in upper and lower surfaces of the pressed workpiece, and being symmetrical in configuration with respect to a cross-sectional plane along a longitudinal axis of the pressed workpiece;

(c) removing the inner portion of the pressed workpiece to form a ring-shaped workpiece having a through hole; and (d) rolling the ring-shaped workpiece and outwardly pressing an inner peripheral surface thereof by a mandrel roll while holding an outer periphery of the ring-shaped workpiece by a forming roll so as to expend a diameter of the through hole until the diameter reaches a required value.

2. The method of claim 1, wherein the manufactured race ring comprises an inner ring, the step (a) forms the upset workpiece having first central recesses in upper and lower surfaces thereof, and the step (b) forms the pressed workpiece having second central recesses in an inner portion thereof, the second central recesses being formed by reducing a thickness of the first central recesses, having the same depth in the upper and lower surfaces of the pressed workpiece, and being symmetrical in configuration with respect to the cross-sectional plane along the longitudinal axis of the pressed workpiece.

3. The method of claim 1, wherein the upset workpiece is formed by the step (a) so that the upset workpiece includes:

first upper and lower shoulder portions formed in an outer peripheral surface of the cylindrical steel billet;

upper and lower flat portions formed respectively between the first central recesses and the first upper and lower shoulder portions; and a projected portion projected outwardly in a radial direction of the upset workpiece between a first upper and lower shoulder portions, the first upper and lower shoulder portions having transfer surfaces with curvatures being substantially identical to a race surface of the manufactured race ring, and the metal flows being deformed substantially in parallel to each other along the transfer surfaces.

4. The method of claim 3, wherein the pressed workpiece is formed by the step (b) so that shapes of the transfer surfaces are similarly maintained without producing any deviation in an amount of extension of an outer periphery of the upset workpiece.

5. The method of claim 1, wherein the manufactured race ring comprises an outer ring, and the step (a) is performed in accordance with an upsetting ratio set within a range of 0.50–0.65.

6. The method of claim 5, wherein the step (a) comprises the steps of:

(1) upsetting the cylindrical steel billet to form a first upset workpiece having a first height;

(2) reversing the first upset workpiece with respect to a longitudinal axis thereof; and (3) upsetting the reversed first upset workpiece so as to reach the upsetting ratio to thereby form a second upset workpiece having a second height smaller than the first height.

7. The method of claim 1, further comprising the step (e) of dividing the rolled workpiece into two parts symmetrically along a direction pressing by the mandrel roll in the step (d).

* * * * *